Patented Feb. 19, 1946

2,395,050

UNITED STATES PATENT OFFICE 2,395,050

REACTION OF SULPHUR DIOXIDE WITH DIOLEFINS AND SEPARATION OF LATTER FROM HYDROCARBON MIXTURES

George W. Hooker, Lewis R. Drake, and Stephen C. Stowe, Midland, Mich., assignors to The Dow Chemical Company, Midland, Mich., a corporation of Michigan No Drawing. Application May 17, 1940,
Serial No. 335,870

12 Claims. (Cl. 260—327)

This invention concerns an improved method of reacting sulphur dioxide with conjugated diolefins to produce sulphones of the type readily decomposed by heat. It particularly concerns the separation of diolefins from mixtures thereof with other hydrocarbons by means of such reaction. More particularly it concerns the separation of butadiene-1.3 from hydrocarbon mixtures containing the same and a butylene or butane.

A number of ways of making hydrocarbon mixtures comprising butadiene and a butylene or butane are well known. Such mixtures when prepared by the pyrolysis of kerosene or other hydrocarbons, usually contain not only butadiene and butylene or butane, but also hydrogen and other hydrocarbons such as methane, ethane, propane, ethylene, propylene, acetylenes, etc. The hydrocarbons having 4 carbon atoms to the molecule, e. g. butadiene and butylene or butane, can readily be separated from the other components by liquefaction and distillation, but they cannot readily be separated from one another by such operation.

Among the various methods for separating butadiene from other hydrocarbons, particularly a butylene or butane, which have heretofore been proposed is reaction of the butadiene with sulphur dioxide to form a solid sulphone which may be separated and decomposed by heating to regenerate the butadiene. It has long been recognized that this reaction, unless carefully controlled, produces a large proportion of an amorphous sulphone which cannot readily be decomposed to regenerate butadiene in good yield and only a poor yield of the desired crystalline sulphone which may satisfactorily be decomposed.

Certain methods for reacting sulphur dioxide with conjugated diolefins to produce crystalline sulphones in good yield and avoid production of the amorphous sulphones have been proposed, but these methods either require an unduly long time of reaction, or have involved incomplete reaction of the diolefin subjected to the treatment and other operating difficulties. For instance, Matthews in U. S. Patent No. 1,196,259 and British Patents 5,073 and 6,897 of 1915, teaches that by carrying such reaction out in the presence of hydrochloric acid, or a substance which is decomposed by water to form hydrochloric acid, formation of the crystalline type of sulphone is promoted. The examples of these patents show that his yields of crystalline sulphone, based upon the amount of diolefin employed, were low and that he did not avoid formation of a substantial amount of the undesired amorphous sulphone as by-product material. Obviously, the use of his highly acidic catalysts would be disadvantageous from a manufacturing viewpoint, since it would preclude employment of ordinary iron or steel apparatus.

Staudinger, in German patent No. 506,839, obtains a crystalline sulphone in excellent yield by reacting sulphur dioxide with butadiene at room temperature or thereabout in the presence of certain inhibitors, e. g. pyrogallol or other polyhydric phenols, etc., which apparently prevent polymerization of the butadiene and the crystalline sulphone product. However, a reaction period of from 2 to 8 days was required in order to obtain substantially complete reaction when operating in such manner.

Perkins in U. S. Patent No. 1,993,681, teaches that the desired crystalline sulphone may be produced in good yield without use of an inhibiting agent by heating a liquefied dilute solution of butadiene in other hydrocarbons at a temperature not higher than 100° C. with only a small proportion, i. e. less than one-half of its weight, of liquid sulphur dioxide and removing the sulphone from the reaction zone as it is formed. In the only detailed example of this patent, i. e. Example 1, 9.3 kilograms of a liquefied cracked petroleum fraction boiling at temperatures between −5.6° and 4.6° C. was heated in an autoclave at 100° C. for 18 hours with 2.6 kilograms of liquid sulphur dioxide, after which the liquid was removed from the autoclave and the components thereof, which were volatile at 80° C. under the pressure applied on the system, were distilled from the sulphone product and returned, together with a small amount of fresh sulphur dioxide, to the autoclave. The latter was then heated at 100° C. for another 18 hour period, after which the sulphone product was separated as before. According to the example, five such cyclic operations were required in order to obtain nearly complete reaction of the butadiene, so that the total reaction period was apparently 90 hours or about 4 days.

An object of this invention is to provide a simple economical method of reacting sulphur dioxide with conjugated diolefins whereby the reaction may be carried out in less than 1 day, e. g., in only a few hours, to produce the crystalline type of sulphone in good yield, based both upon the quantity of diolefin employed and upon that consumed in the reaction. Another object is to provide an improved method of separating diolefins from hydrocarbon mixtures containing the same which involves selectively reacting sulphur dioxide with the diolefin under the newly discovered reaction conditions. Other objects will be apparent from the following description of the invention.

We have observed that the reaction of sulphur dioxide with diolefins occurs sluggishly at room temperature and thereabout, and that temperatures above 60° C., preferably between 70° and 150° C., are required in order to obtain satisfactorily rapid reaction. We have further found that it is an equilibrium reaction and that at temperatures within the range just given the rate of reaction, the total yield of sulphone, and the yield of the crystalline type of sulphone vary with changes in the reaction temperature and the proportion of sulphur dioxide employed, as follows:

(a) As usual, an increase in temperature increases the rate of reaction;

(b) An increase in temperature favors formation of a crystalline type of sulphone; conversely lower temperatures favor formation of the amorphous type of sulphone;

(c) An increase in temperature shifts the equilibrium in the equation:

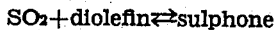
$$SO_2 + \text{diolefin} \rightleftarrows \text{sulphone}$$

toward the left and may prevent complete consumption of the diolefin;

(d) The higher temperatures favor side reactions, e. g. polymerization of the diolefins, but such reactions are sluggish as compared with the reaction for formation of the sulphone;

(e) An increase in the ratio of sulphur dioxide to diolefin increases the rate of reaction;

(f) An increase in the ratio of sulphur dioxide to diolefin shifts the equilibrium toward formation of sulphone and thus favors more complete consumption of the diolefin;

(g) An increase in the ratio of sulphur dioxide to diolefin usually favors formation of the crystalline type of sulphone.

From items a—d it will be noted that the higher reaction temperatures favor rapid reaction and formation of the crystalline, instead of the amorphous, type of sulphone, but that they may prevent complete consumption of the diolefin and may cause by-product formation, e. g. polymerization, of the diolefin. It will also be noted that although the lower reaction temperatures favor complete consumption of the diolefin, they also favor production of the amorphous, instead of the desired crystalline, type of sulphone and the reaction is relatively sluggish at the lower temperatures. Accordingly, high reaction temperatures favor the reaction in certain respects and low reaction temperatures favor it in other respects. At any given reaction temperature one or more unfavorable results are obtained. In the prior art, the reaction is carried out as completely as possible at substantially constant temperature.

We have further found that the reaction may be carried out rapidly to produce the crystalline type of sulphone in excellent yield by starting the reaction at a high temperature, e. g. above 80° and preferably between 100° and 150° C., and gradually lowering the temperature as the reaction progresses. During the earlier stages of the reaction at the initial high temperature, the reaction occurs rapidly to produce the crystalline type of sulphone as the principal product until it approaches a condition of equilibrium between the sulphone product and the sulphur dioxide and diolefin reactants. As the temperature is lowered during the later stages of the reaction the equilibrium shifts so as to favor formation of the sulphone and assure more complete consumption of the diolefin and sulphur dioxide. For instance, when a liquefied equimolecular mixture of sulphur dioxide and butadiene is reacted, the equilibrium at 140° C. is such as to permit only about 63 per cent of the butadiene to be converted to the sulphone, but upon reducing the temperature to 70° C. the equilibrium shifts so as to permit practically complete conversion of the butadiene to the sulphone. Accordingly, this mode of carrying out the reaction gives the advantages obtained at high reaction temperatures and also those obtained at lower reaction temperatures and it largely avoids the disadvantageous results obtained by operation at either such temperature alone.

The process may, of course, be applied in producing a sulphone from sulphur dioxide and a pure diolefin, but it is particularly applicable in separating diolefins from hydrocarbon mixtures containing the same, e. g. cracked-oil gas or the higher fractions thereof.

In carrying out the reaction, the sulphur dioxide and diolefin-containing hydrocarbon material are charged into an autoclave or bomb under a pressure sufficient to cause at least partial liquefaction. The sulphur dioxide and hydrocarbon material may be used in any desired proportions, but the reaction occurs most rapidly and favorably when using at least 0.75 part by weight, and preferably more than 1 part, of sulphur dioxide per part of hydrocarbon. The sulphur dioxide may of course be used in as large a proportion as desired. An inhibitor against formation of the amorphous type of sulphone may advantageously be added, but is not required, since the invention permits production of crystalline sulphones in excellent yield without the use of inhibitors. Any of the previously known inhibitors against the formation of amorphous sulphones may be used for this purpose. Phenols, particularly polyhydric phenols, are especially effective, not only in inhibiting the formation of amorphous sulphones, but also in preventing other side reactions. Examples of inhibitors which may be employed are phenol, cresol, catechol, tertiary-butyl catechol, pyrogallol, etc. An inhibitor is usually employed in amount corresponding to between 0.05 and 0.1 per cent of the weight of the diolefin, but it may be used in larger or smaller proportion, if desired. It may be mentioned that when a conjugated diolefin of 90 per cent purity or higher is employed in the reaction there is some tendency for it, particularly at the higher temperatures, to undergo partial polymerization. An inhibitor may advantageously be used to counter-act this tendency. When a hydrocarbon mixture containing less than 90 per cent by weight of diolefin is subjected to the treatment there is less tendency for the diolefin to undergo polymerization and the reaction may satisfactorily be carried out without the use of an inhibitor. The reaction may be carried out most satisfactorily by using hydrocarbon mixtures containing from 10 to 90 per cent by weight of diolefin as a starting material.

The mixture is heated under pressure to a reaction temperature preferably between 100° and 150° C. and the temperature is lowered by 10° C. or more as the reaction progresses. In general, the yield of crystalline sulphone improves with the extent to which the temperature is lowered during the reaction. In practice, the temperature is reduced during the reaction to below 100° C., preferably to 80° C. or lower.

The reaction may be carried out in batch manner, or continuously, as desired. For instance, an ordinary iron or steel autoclave may be charged with the liquefied reaction mixture and the reaction be started at a temperature of 100°–150° C., after which the temperature be reduced gradually, or in stages, e. g. to 80° C. or lower. Although the reaction occurs in the liquid phase, it is not necessary that the autoclave be entirely filled. The presence of vapors above the reaction mixture is not detrimental. The mixture is preferably maintained at each of the successively decreasing temperatures for a time sufficient nearly to reach the equilibrium condition. The time of heating at 140° C. necessary to attain equilibrium is usually not greater than 0.5 hour, and the period over which the temperature may thereafter gradually be lowered to 80° C. to obtain an excellent yield of crystalline sulphone need not exceed 3 hours. It will be understood, from the facts hereinbefore given, that the time required to attain an equilibrium condition by heating the same initial mixture to a temperature of 80° C. and maintaining it at said temperature is considerably longer than the total reaction period just given. Also, there is greater tendency toward formation of amorphous sulphone when the reaction is carried out at a constant temperature of 80° C. than when it is started at a higher temperature and the temperature is reduced to 80° C. during the reaction. It is only by starting the reaction at a relatively high temperature and dropping the temperature as the reaction progresses that a maximum yield of crystalline sulphone may be produced in such short time.

In practice, the reaction is preferably carried out continuously by passing the mixture, under a pressure sufficient to cause at least partial liquefaction, through a tubular autoclave. The temperature of the mixture during passage through the autoclave may be reduced from an initial reaction temperature of between 100° and 150° C. to a temperature below 100° C., preferably to 80° C. or lower.

The product issuing from the autoclave usually is a solution or mixture of the sulphone in diluents such as excess sulphur dioxide, olefins or paraffin hydrocarbons, etc., although it is possible to produce the substantially pure sulphone directly from equimolecular proportions of the pure reactants. Hydrocarbons, such as butylene or butane, vaporize from such usual product on releasing the pressure and may be recovered in a form relatively free of the diolefin. If desired, the vapors may be treated, e. g. with water or an alkali, to remove any sulphur dioxide therein. Excess sulphur dioxide remaining with the sulphone may be vaporized off by mild heating or by applying a vacuum to obtain the sulphone as a residue. The sulphone may be dissociated into the diolefin and sulphur dioxide by somewhat more vigorous heating, e. g. heating at about 120° C. or higher. The pure diolefin may be separated from its mixture with sulphur dioxide in any of the usual ways, e. g. by scrubbing sulphur dioxide from the mixture with water or by passing the vapor mixture through an alkali to remove the sulphur dioxide, etc.

The following tables present data collected in several series of experiments on the reaction of sulphur dioxide with butadiene-1.3. The series of experiments reported in the respective tables differ with regard to the hydrocarbons subjected to the treatment as follows: In the experiments of Table I the hydrocarbon starting material was substantially pure butadiene-1.3, whereas in Tables II, III, IV, and V hydrocarbon mixtures consisting substantially of butylene and butadiene and containing 61.1%, 33.7%, 20.8%, and 9.5% of butadiene, respectively, were subjected to the treatments. The general procedure in carrying out a test was to charge a bomb with the liquefied sulphur dioxide and hydrocarbon reaction mixture, heat the bomb at the temperatures indicated in the table for the time also given and cool and open the bomb. The reacted mixture was then analyzed to determine the total yield of sulphone, based on the butadiene employed, and the yields on the same basis of the readily decomposable crystalline sulphone and of the difficultly decomposable amorphous sulphone. Each table presents experiments showing the effect of varying the reaction temperature, the molecular ratio of sulphur dioxide to butadiene, and the time of heating. It also includes experiments showing the increase in the yield of crystalline sulphone and the decrease in time required for completion of the reaction which are brought about by starting the reaction at a temperature between 100° and 150° C. and gradually lowering the temperature during the reaction. Certain of the experiments presented in the tables were carried out in the presence of para-tertiary-butyl-catechol as an agent for preventing possible polymerization of the butadiene and for inhibiting formation of the amorphous type of sulphone. The tertiary-butyl-catechol was used in amount corresponding to about 0.15 per cent of the weight of the butadiene. Each table is captioned by statement of the per cent concentration of butadiene in the hydrocarbon mixtures employed. Each table gives the initial molecular ratio of sulphur dioxide to butadiene in each reaction mixture, states whether or not tertiary-butyl-catechol was present, states the temperature or temperatures at which the reaction was carried out, and gives the time of heating at the reaction temperature. The tables give the total yield of sulphone for each experiment and the yield of crystalline sulphone and of amorphous sulphone, said yields being based upon the butadiene employed. The tables also give the ratio by weight of crystalline sulphone product to amorphous sulphone for each run. In each run where a single reaction temperature is given, the reaction was carried out at the substantially constant temperature. Where a run is indicated as having been carried out over a temperature range, e. g. the temperature range "12°–80° C.," the reaction mixture was initially heated to the higher temperature and the temperature was gradually lowered over the range indicated during the reaction. It may be mentioned that the runs in the tables which were carried out in accordance with the invention are runs 13–16 of Table I, runs 16–20 of Table II, run 22 of Table III, runs 14–15 of Table IV, and runs 14–16 of Table V. The other runs are presented for purpose of comparison.

TABLE I

*Runs using pure butadiene*

| Run No. | Mol. ratio $SO_2/C_4H_6$ | Tert.-butyl catechol present | Temp., °C. | Time, hrs. | Sulphone yield Total, per cent | Crystalline, per cent | Amorphous, per cent | Wt. ratio of crystalline/ amorphous sulphone |
|---|---|---|---|---|---|---|---|---|
| 1 | 3.7 | No | 110 | 1 | 94 | 88 | 6 | 14.7 |
| 2 | 3.7 | No | 110 | 4 | 93.8 | 88.1 | 5.7 | 15.5 |
| 3 | 1.9 | No | 110 | 1 | 94.8 | 82.8 | 12 | 6.9 |
| 4 | 1.9 | No | 110 | 4 | 100 | 86 | 14 | 6.2 |
| 5 | 0.8 | No | 110 | 1 | 68.8 | 56.5 | 12.3 | 4.6 |
| 6 | 0.8 | No | 110 | 4 | 84.0 | 49.5 | 34.5 | 1.4 |
| 7 | 4.0 | No | 95 | 1 | 85.4 | 74 | 11.4 | 6.5 |
| 8 | 4.0 | No | 95 | 4 | 96.9 | 86.4 | 10.5 | 8.2 |
| 9 | 1.9 | No | 95 | 1 | 97.7 | 83.7 | 14.0 | 6.0 |
| 10 | 1.9 | No | 95 | 4 | 100 | 69.5 | 30.5 | 2.3 |
| 11 | 0.7 | No | 95 | 1 | 53.3 | 36.3 | 17.0 | 2.1 |
| 12 | 0.7 | No | 95 | 4 | 70.5 | 39.6 | 30.9 | 1.3 |
| 13 | 4.0 | No | 120–80 | 4 | 82.7 | 80.5 | 2.2 | 36.6 |
| 14 | 4.1 | No | 140–80 | 3 | 98.7 | 96.4 | 2.3 | 41.9 |
| 15 | 1.9 | Yes | 120–80 | 4 | 96.8 | 96 | 0.8 | 120 |
| 16 | 3.9 | Yes | 120–80 | 4 | 98 | 98 | Nil | Infinity |

TABLE II

*Runs using 61.1% butadiene*

| Run No. | Mol. ratio $SO_2/C_4H_6$ | Tert.-butyl catechol present | Temp., °C. | Time, hrs. | Sulphone yield Total, per cent | Crystalline, per cent | Amorphous, per cent | Wt. ratio of crystalline/ amorphous sulphone |
|---|---|---|---|---|---|---|---|---|
| 1 | 4 | No | 120 | 4 | 87.8 | 84.0 | 3.8 | 22.2 |
| 2 | 3.6 | No | 110 | 4 | 95.8 | 87.5 | 8.3 | 10.6 |
| 3 | 2.0 | No | 110 | 4 | 92.5 | 79.0 | 13.5 | 5.9 |
| 4 | 0.77 | No | 110 | 4 | 63.6 | 45.6 | 18.0 | 2.5 |
| 5 | 3.9 | No | 95 | 1 | 93.3 | 79.3 | 14.0 | 5.6 |
| 6 | 3.9 | No | 95 | 2 | 99 | 88.5 | 10.5 | 8.4 |
| 7 | 3.9 | No | 95 | 8 | 95.2 | 86.4 | 8.8 | 9.8 |
| 8 | 2 | No | 95 | 1 | 77.5 | 57.5 | 20.0 | 2.9 |
| 9 | 2 | No | 95 | 4 | 93.0 | 69.3 | 23.7 | 2.9 |
| 10 | 2 | No | 95 | 8 | 97.0 | 72.0 | 25.0 | 2.9 |
| 11 | 0.9 | No | 95 | 1 | 26.4 | 20.7 | 5.7 | 3.6 |
| 12 | 0.9 | No | 95 | 2 | 59.4 | 36.4 | 23.0 | 1.6 |
| 13 | 0.9 | No | 95 | 4 | 79.3 | 45.7 | 33.6 | 1.4 |
| 14 | 0.9 | No | 95 | 8 | 77.6 | 39.6 | 38.0 | 1.0 |
| 15 | 3.8 | No | 80 | 8 | 100 | 66.7 | 33.3 | 2.0 |
| 16 | 4 | No | 140–80 | 3 | 100 | 96.0 | 4.0 | 24.0 |
| 17 | 2.3 | No | 120–80 | 4 | 99.1 | 93.8 | 5.3 | 17.7 |
| 18 | 4 | No | 120–80 | 4 | 100 | 94.5 | 5.3 | 17.2 |
| 19 | 19.8 | No | 120–80 | 4 | 94.0 | 93.0 | 1.0 | 93.0 |
| 20 | 4 | Yes | 120–80 | 4 | 100 | 98.2 | 0.8 | 123.0 |

TABLE III

*Runs using 33.7% butadiene*

| Run No. | Mol. ratio $SO_2/C_4H_6$ | Tert.-butyl catechol present | Temp., °C. | Time, hrs. | Sulphone yield Total, per cent | Crystalline, per cent | Amorphous, per cent | Wt. ratio of crystalline/ amorphous sulphone |
|---|---|---|---|---|---|---|---|---|
| 1 | 4.5 | No | 120 | 4 | 83.8 | 78.8 | 5.0 | 15.8 |
| 2 | 5 | No | 110 | 1 | 69.0 | 61.8 | 7.2 | 8.6 |
| 3 | 5 | No | 110 | 4 | 94.9 | 87.5 | 7.4 | 11.8 |
| 4 | 5 | No | 110 | 8 | 94.9 | 87.8 | 7.1 | 12.4 |
| 5 | 2.4 | No | 110 | 1 | 54.3 | 48.5 | 5.8 | 8.4 |
| 6 | 2.4 | No | 110 | 4 | 84.2 | 74.6 | 9.6 | 7.8 |
| 7 | 2.4 | No | 110 | 8 | 83.0 | 75.5 | 7.5 | 10.1 |
| 8 | 1.4 | No | 110 | 1 | 42.2 | 33.2 | 11.6 | 2.9 |
| 9 | 1.4 | No | 110 | 4 | 71.6 | 61.4 | 10.2 | 6.0 |
| 10 | 1.4 | No | 110 | 8 | 75.5 | 65.2 | 10.3 | 6.3 |
| 11 | 4.8 | No | 95 | 1 | 68.9 | 59.1 | 9.8 | 6.0 |
| 12 | 4.8 | No | 95 | 2 | 92.7 | 82.1 | 10.5 | 7.8 |
| 13 | 4.8 | No | 95 | 4 | 98.9 | 89.5 | 9.4 | 9.5 |
| 14 | 4.8 | No | 95 | 8 | 97.7 | 87.0 | 10.7 | 8.1 |
| 15 | 2.5 | No | 95 | 1 | 38.9 | 29.2 | 9.7 | 3.0 |
| 16 | 2.5 | No | 95 | 4 | 85.6 | 69.8 | 15.8 | 4.4 |
| 17 | 2.5 | No | 95 | 8 | 96.9 | 75.2 | 21.7 | 3.5 |
| 18 | 1.5 | No | 95 | 1 | 22.4 | 18.6 | 3.8 | 4.9 |
| 19 | 1.5 | No | 95 | 2 | 37.2 | 27.7 | 9.5 | 2.9 |
| 20 | 1.5 | No | 95 | 4 | 80.6 | 56.4 | 24.2 | 2.3 |
| 21 | 1.5 | No | 95 | 8 | 89.8 | 64.1 | 25.7 | 2.5 |
| 22 | 4.4 | No | 140–60 | 3 | 100 | 99.1 | 0.9 | 110 |

TABLE IV

Runs using 20.8% butadiene

| Run No. | Mol. ratio $SO_2/C_4H_6$ | Tert.-butyl catechol present | Temp., °C. | Time, hrs. | Sulphone yield | | | Wt. ratio of crystalline/ amorphous sulphone |
|---|---|---|---|---|---|---|---|---|
| | | | | | Total, per cent | Crystalline, per cent | Amorphous, per cent | |
| 1 | 3.7 | No | 120 | 4 | 73.7 | 62.2 | 11.5 | 5.4 |
| 2 | 4 | No | 110 | 2 | 73.2 | 62.0 | 11.2 | 5.5 |
| 3 | 4 | No | 110 | 8 | 82.5 | 71.5 | 11.0 | 6.5 |
| 4 | 4 | No | 110 | 16 | 85.3 | 72.7 | 12.6 | 5.8 |
| 5 | 1.9 | No | 110 | 4 | 49.3 | 34.5 | 14.8 | 2.3 |
| 6 | 1.9 | No | 110 | 8 | 52.3 | 43.4 | 8.9 | 4.9 |
| 7 | 1.9 | No | 110 | 16 | 56.5 | 46.1 | 10.4 | 4.4 |
| 8 | 4.2 | No | 95 | 2 | 67.0 | 55 | 12.0 | 4.6 |
| | | | | 8 | 99.7 | 85 | 14.7 | 5.8 |
| | | | | 16 | 99.9 | 86 | 13.9 | 6.2 |
| 11 | 1.9 | No | 95 | 1 | 23.2 | 11 | 12.2 | 0.9 |
| | | | | 2 | 35.4 | 11.8 | 23.6 | 0.5 |
| | | | | 8 | 88.6 | 86.0 | 22.6 | 3.8 |
| 14 | 4 | No | 140-80 | 3 | 75.3 | 67.0 | 8.3 | 8.1 |
| 15 | 3.9 | No | 120-80 | 4 | 100 | 88.4 | 11.6 | 7.6 |

TABLE V

Runs using 9.5% butadiene

| Run No. | Mol. ratio $SO_2/C_4H_6$ | Tert.-butyl catechol present | Temp., °C. | Time, hrs. | Sulphone yield | | | Wt. ratio of crystalline/ amorphous sulphone |
|---|---|---|---|---|---|---|---|---|
| | | | | | Total, per cent | Crystalline, per cent | Amorphous, per cent | |
| 1 | 4.3 | No | 120 | 4 | 56.0 | 37.3 | 18.7 | 2.0 |
| 2 | 4.2 | No | 110 | 4 | 57.7 | 33.5 | 24.2 | 1.4 |
| 3 | 4.2 | No | 110 | 8 | 61.4 | 36.5 | 24.9 | 1.5 |
| 4 | 4.2 | No | 110 | 16 | 61.0 | 37.6 | 23.4 | 1.6 |
| 5 | 2 | No | 110 | 2 | 36.6 | 10.6 | 24.0 | 0.4 |
| 6 | 2 | No | 110 | 8 | 41.1 | 11.3 | 29.8 | 0.4 |
| 7 | 4.4 | No | 95 | 2 | 57.0 | 22.6 | 24.4 | 0.9 |
| 8 | 4.4 | No | 95 | 4 | 62.6 | 37.1 | 25.5 | 1.5 |
| 9 | 4.4 | No | 95 | 8 | 80.1 | 50.4 | 29.7 | 1.7 |
| 10 | 2.1 | No | 95 | 2 | 33.2 | 9.2 | 24.0 | 0.4 |
| 11 | 2.1 | No | 95 | 4 | 37.6 | 17.2 | 20.4 | 0.9 |
| 12 | 2.1 | No | 95 | 8 | 55.8 | 23.6 | 32.2 | 0.8 |
| 13 | 4.7 | No | 80 | 8 | 66.5 | 37.5 | 29.0 | 1.3 |
| 14 | 4 | No | 120-80 | 4 | 66.7 | 44.2 | 22.5 | 2 |
| 15 | 17.3 | No | 120-80 | 4 | 100 | 79.5 | 20.5 | 3.9 |
| 16 | 18.3 | No | 140-80 | 3 | 99.0 | 96.4 | 2.6 | 37 |

From comparison of: runs 13-16 with runs 1-15 in Table I; runs 16-20 with runs 1-15 in Table II; run 22 with 1-21 in Table III; runs 14-15 with 1-13 in Table IV; and runs 14-16 in Table V it will be seen that by starting the reaction at a high temperature and lowering the temperature as it progresses, the time for substantially complete consumption of the diolefin is reduced to considerably less than that required when operating at a constant reaction temperature, and the yield of crystalline sulphone on the diolefin employed or on that consumed, and usually on both bases, is increased markedly. Comparisons between runs 13 and 14 in Table I and between runs 15 and 16 in Table V show that the yield of crystalline sulphone approaches that theoretically possible as the difference between the temperature at which a reaction is started and that at which it is completed becomes greater. From comparison of runs 13 and 14 with runs 15 and 16 in Table I; and of run 18 with run 20 in Table II it will be seen that the presence of an inhibitor suppresses any tendency toward by-product formation, and usually increases the yield of crystalline sulphone to a considerable extent.

The invention is not restricted to the preparation of butadiene sulphone, but may also be applied in making sulphones of other conjugated diolefins, e. g. isoprene, 2.3-dimethyl-butadiene-1.3, 2-ethyl-butadiene-1.3, etc. The invention may also be applied, as hereinbefore described, in separating any such diolefin from mixtures thereof with other hydrocarbons, e. g. olefins or paraffin hydrocarbons which distill therewith.

Other modes of applying the principle of the invention may be employed instead of those explained, change being made as regards the methods herein disclosed, provided that the step or steps stated by any of the following claims or the equivalent of such stated step or steps be employed.

We therefore particularly point out and distinctly claim as our invention:

1. In a method for reacting sulphur dioxide with a conjugated diolefin to produce a crystalline sulphone of the latter, the steps which consist in heating a diolefin-containing starting material with at least 0.75 of its weight of sulphur dioxide at a pressure sufficient at least partially to liquefy the mixture to reaction temperatures which in the earlier stages of the reaction are between 100° and 150° C. but which are lowered by more than 10° C. and to below 100° C. during the reaction, and continuing heating of the liquefied reaction mixture at the reaction temperature below 100° C., which is employed in the later stages of the reaction, until the reaction approaches an equilibrium condition, whereby the reaction may be completed in less than 1 day to obtain a crystallizable sulphone of the diolefin in high yield.

2. In a method wherein sulphur dioxide and a conjugated diolefin are reacted in liquid phase at super-atmospheric pressure to produce a crystalline sulphone of the diolefin, the steps of initially employing at least 0.75 part by weight of sulphur dioxide per part of the diolefin-containing starting material, carrying the reaction out in its earlier stages at temperatures between 100° and 150° C., lowering the temperature by more than 10° C. and to below 100° C. during the reaction, and heating the reaction mixture at the later reaction temperatures of below 100° C. until the reaction approaches an equilibrium condition, whereby the reaction may be carried substantially to completion in less than 1 day to produce a crystallizable sulphone of the diolefin in high yield.

3. In a method wherein sulphur dioxide and a conjugated diolefin are reacted in liquid phase at super-atmospheric pressure to form a crystallizable sulphone of the diolefin, the steps which consist in initially employing at least 0.75 part by weight of sulphur dioxide per part of the diolefin-containing starting material, carrying the reaction out in the presence of an inhibitor against formation of the amorphous type of sulphone in its earlier stages at a reaction temperature between 100° and 150° C., gradually lowering the temperature by more than 10° C., and to a reaction temperature below 100° C. during the reaction, and heating the reaction mixture at the final reaction temperatures of below 100° C. until the reaction approaches an equilibrium condition, whereby the reaction may be carried substantially to completion in less than 1 day to produce a crystallizable sulphone of the diolefin in high yield.

4. In a method for producing crystallizable sulphones of conjugated diolefins wherein sulphur dioxide is heated together with a mixture of hydrocarbons comprising a conjugated diolefin at a super-atmospheric pressure sufficient at least partially to liquefy the reaction mixture, the steps which consist in employing sulphur dioxide in amount at least equal to the weight of the hydrocarbon mixture, heating the reaction mixture initially to a reaction temperature between 100° and 150° C., lowering the temperature by more than 10° C. and to a reaction temperature below 100° C. during the reaction, and heating the mixture during the final stages of the reaction at temperatures below 100° C. until the reaction approaches an equilibrium condition, the total time for carrying out the reaction being less than 1 day.

5. In a method wherein sulphur dioxide is heated with a hydrocarbon mixture comprising a conjugated diolefin at a super-atmospheric pressure sufficient at least partially to liquefy the reaction mixture, the steps which consist in initially employing at least 1 part by weight of sulphur dioxide per part of the hydrocarbon mixture and of carrying the reaction out in the presence of an agent for preventing formation of the amorphous type of sulphone at reaction temperatures which in the earlier stages of the reaction are between 100° and 150° C., but which during the reaction, are lowered by more than 10° C. and to below 100° C., and continuing heating of the liquefied mixture at the final reaction temperatures of below 100° C. until the reaction approximates an equilibrium condition, the total time of reaction being less than 1 day.

6. In a method for producing crystallizable sulphones of conjugated diolefins wherein sulphur dioxide and a hydrocarbon mixture comprising a conjugated diolefin are heated together at a super-atmospheric pressure sufficient at least partially to liquefy the reaction mixture, the steps which consist in initially employing at least 1 part by weight of sulphur dioxide per part of the hydrocarbon mixture and carrying the reaction out in the presence of a small proportion of a phenol at reaction temperatures which in the early stages of the reaction are between 100° and 150° C., but which are lowered during the reaction by more than 10° C. and to a reaction temperature below 100° C., continuing heating of the reaction mixture at the final temperatures of below 100° C. until the reaction approaches an equilibrium condition, the total time of reaction being less than 1 day, and thereafter separating the sulphone product.

7. In a method of making the crystallizable sulphone of butadiene-1.3 wherein sulphur dioxide and a butadiene-containing starting material are heated to a reaction temperature at a super-atmospheric pressure sufficient at least partially to liquefy the reaction mixture, the steps which consist in initially employing at least 0.75 part of sulphur dioxide per part of the butadiene-containing starting material and carrying the reaction out at reaction temperatures which in the earlier stages of the reaction are between 100° and 150° C., but which are lowered by more than 10° C. and to a reaction temperature below 100° C. during the reaction, and continuing heating of the reaction mixture at the final reaction temperatures of below 100° C. until the reaction approximates an equilibrium condition, whereby the reaction may be carried substantially to completion in less than 1 day to produce a crystallizable sulphone of the butadiene-1.3 in high yield.

8. The method which comprises heating a hydrocarbon material, containing butadiene-1.3, together with at least an equal weight of sulphur dioxide to a reaction temperature between 100° and 150° C. at a pressure sufficient at least partially to liquefy the mixture, lowering the temperature by more than 10° C. and to a reaction temperature below 100° C. as the reaction progresses, and continuing heating of the reaction mixture at the final reaction temperatures of below 100° C. until the reaction approximates an equilibrium condition, the total time of reaction being less than 1 day.

9. The method which comprises heating a hydrocarbon material, containing butadiene-1.3, together with at least an equal weight of sulphur dioxide and a small proportion of an agent for inhibiting the formation of an amorphous type of sulphone to a reaction temperature between 100° and 150° C. at a pressure sufficient at least partially to liquefy the mixture, gradually lowering the temperature by more than 10° C. and to a reaction temperature below 100° C. as the reaction progresses, and continuing heating of the mixture at the final reaction temperatures of below 100° C. until the reaction approximates an equilibrium condition, the total time of reaction being less than 1 day.

10. The method which comprises heating a hydrocarbon mixture, containing butadiene-1.3, with more than an equal weight of sulphur dioxide in the presence of a small proportion of a phenol to a reaction temperature between 100° and 150° C. at a pressure sufficient at least partially to liquefy the mixture, lowering the temperature by more than 10° C. and to a reaction temperature below 100° C. as the reaction progresses, and continuing heating of the mixture at the final reaction temperatures of below 100° C. until the reaction approximates an equilibrium condition, the total time of reaction being less than 1 day.

11. The method which comprises heating a hydrocarbon mixture, containing butadiene-1.3, together with more than an equal weight of sulphur dioxide in the presence of a small proportion of a polyhydric phenol to a reaction temperature between 100° and 150° C. at a pressure sufficient at least partially to liquefy the mixture, lowering the temperature by more than 10° C. and to a reaction temperature below 100° C. as the reaction progresses, continuing heating of the mixture at the final reaction temperatures of below 100° C. until the reaction approximates an equilibrium condition, and thereafter separating the sulphone product.

12. The process which comprises reacting a hydrocarbon material comprising aliphatic conjugated diolefins with more than one mole of $SO_2$ per mole of said diolefin at a temperature above approximately 130° C. under a pressure higher than necessary to liquefy the $SO_2$ at the temperature used.

GEORGE W. HOOKER.
LEWIS R. DRAKE.
STEPHEN C. STOWE.